US007634639B2

(12) United States Patent
Chaudhry et al.

(10) Patent No.: US 7,634,639 B2
(45) Date of Patent: Dec. 15, 2009

(54) AVOIDING LIVE-LOCK IN A PROCESSOR THAT SUPPORTS SPECULATIVE EXECUTION

(75) Inventors: Shailender Chaudhry, San Francisco, CA (US); Paul Caprioli, Mountain View, CA (US); Sherman H. Yip, San Francisco, CA (US); Guarav Garg, Sunnyvale, CA (US); Ketaki Rao, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 171 days.

(21) Appl. No.: 11/210,557

(22) Filed: Aug. 23, 2005

(65) Prior Publication Data

US 2007/0050601 A1    Mar. 1, 2007

(51) Int. Cl.
 *G06F 9/30*    (2006.01)
(52) U.S. Cl. ....................... 712/225; 712/219
(58) Field of Classification Search .................. 712/225
 See application file for complete search history.

(56) References Cited

U.S. PATENT DOCUMENTS

| 5,276,847 | A  | * | 1/1994 | Kohn | ........................ | 711/163 |
| 5,740,391 | A  | * | 4/1998 | Hunt | ........................ | 712/200 |
| 6,385,715 | B1 | * | 5/2002 | Merchant et al. | ............ | 712/219 |
| 6,785,803 | B1 | * | 8/2004 | Merchant et al. | ............ | 712/219 |
| 2002/0099912 | A1 | * | 7/2002 | Nakamura et al. | .......... | 711/119 |
| 2002/0199178 | A1 | * | 12/2002 | Hobbs et al. | ................ | 717/150 |
| 2004/0133769 | A1 |  | 7/2004 | Chaudhry et al. | ........... | 712/233 |

(Continued)

FOREIGN PATENT DOCUMENTS

WO    WO 0125903 A1 *   4/2001

OTHER PUBLICATIONS

"Closing the window of vulnerability in multiphase memory transactions," Kubiatowicz, John; Chaiken, David; Agarwal, Anant, Proceedings of the fifth international conference on Architectural support for programming languages and operating systems, pp. 274-284, 1992.*

(Continued)

*Primary Examiner*—Eddie P Chan
*Assistant Examiner*—Keith Vicary
(74) *Attorney, Agent, or Firm*—Park, Vaughan & Fleming LLP; Anthony P. Jones

(57) ABSTRACT

One embodiment of the present invention provides a system which avoids a live-lock state in a processor that supports speculative-execution. The system starts by issuing instructions for execution in program order during execution of a program in a normal-execution mode. Upon encountering a launch condition during the execution of an instruction (a "launch instruction") which causes the processor to enter a speculative-execution mode, the system checks status indicators associated with a forward progress buffer. If the status indicators indicate that the forward progress buffer contains data for the launch instruction, the system resumes normal-execution mode. Upon resumption of normal-execution mode, the system retrieves the data from a data field contained in the forward progress buffer and executes the launch instruction using the retrieved data as input data for the launch instruction. The system next deasserts the status indicators. The system then continues to issue instructions for execution in program order in normal-execution mode. Using the forward progress buffer in this way prevents the processor from entering a potential live-lock state.

20 Claims, 5 Drawing Sheets

U.S. PATENT DOCUMENTS

2004/0215933 A1    10/2004    Nguyen et al. .............. 712/200
2007/0277025 A1*   11/2007    Altman et al. .............. 712/245

OTHER PUBLICATIONS

"Closing the window of vulnerability in multiphase memory transactions" the Alewife Transaction Store by John David Kubiatowicz; Feb. 1993.*

Mutlu et al. (Techniques for Efficient Processing in Runahead Execution Engines); International Symposium on Computer Architecture ; Proceedings of the 32nd annual international symposium on Computer Architecture ; Year of Publication: 2005.*

Slashdot (Sun Kills Rock CPU, says NYT Report); Accessed Jun. 18, 2009; Published Jun. 16, 2009.*

* cited by examiner

AVOIDING LIVE-LOCK IN A PROCESSOR THAT SUPPORTS SPECULATIVE EXECUTION

BACKGROUND

1. Field of the Invention

The present invention relates to techniques for improving the performance of computer systems. More specifically, the present invention relates to a method and apparatus for avoiding live-lock in a processor that supports speculative execution.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

When a memory reference generates a cache miss, the subsequent access to level-two (L2) cache (or main memory) can require dozens or hundreds of clock cycles to complete, during which time the processor is typically idle, performing no useful work.

A number of techniques are presently used (or have been proposed) to hide this cache-miss latency. Some processors support out-of-order execution, in which instructions are kept in an issue queue, and are issued "out-of-order" when operands become available. Unfortunately, existing out-of-order designs have a hardware complexity that grows quadratically with the size of the issue queue. Practically speaking, this constraint limits the number of entries in the issue queue to one or two hundred, which is not sufficient to hide memory latencies as processors continue to get faster. Moreover, constraints on the number of physical registers that can be used for register renaming purposes during out-of-order execution also limit the effective size of the issue queue.

Some processor designers have proposed using speculative-execution to avoid the pipeline stalls associated with cache misses. Two such proposed speculative-execution modes are: (1) execute-ahead mode and (2) scout mode.

Execute-ahead mode operates as follows. During normal execution, the system issues instructions for execution in program order. Upon encountering an unresolved data dependency during execution of an instruction, the system generates a checkpoint that can be used to return execution of the program to the point of the instruction. Next, the system executes subsequent instructions in the execute-ahead mode, wherein instructions that cannot be executed because of an unresolved data dependency are deferred, and wherein other non-deferred instructions are executed in program order.

If the unresolved data dependency is resolved during execute-ahead mode, the system enters a deferred execution mode, wherein the system executes deferred instructions. If all deferred instructions are executed during this deferred execution mode, the system returns to normal-execution mode to resume normal program execution from the point where the execute-ahead mode left off. Alternatively, if all deferred instructions are not executed, the system returns to execute-ahead mode until the remaining unresolved data dependencies are resolved and the deferred instructions can be executed.

If the system encounters a non-data-dependent stall condition while executing in normal mode or execute-ahead mode, the system moves into scout mode. In scout mode, instructions are speculatively executed to prefetch future loads, but results are not committed to the architectural state of the processor. When the launch point stall condition (the unresolved data dependency or the non-data dependent stall condition that originally caused the system to move out of normal-execution mode) is finally resolved, the system uses the checkpoint to resume execution in normal mode from the launch point instruction (the instruction that originally encountered the launch point stall condition).

By allowing a processor to continue to perform useful work during stall conditions, speculative-execution can significantly increase the amount of computational work the processor is able to complete.

Speculative execution provides performance advantages, but also complicates the operation of the processor. For example, while transitioning from speculative-execution mode to normal-execution mode, the processor can inadvertently enter a "live-lock," during which the processor repeatedly executes the same group of instructions, making no forward progress.

For example, FIG. 1 illustrates a sequence of instructions that causes a processor to enter a live-lock state. The processor first executes LOAD 100, which misses in the L1 cache. This miss causes the processor to generate a request for the cache line from remote memory. In order to keep making forward progress while the request is outstanding, the processor generates a checkpoint (CHKPT0) at LOAD 100 and commences executing instructions in scout mode.

After executing USE 101 and a number of subsequent instructions in scout mode, the requested cache line for LOAD 100 returns. The processor then restores CHKPT0 (indicated by the solid line) and resumes normal-execution mode starting with LOAD 100.

This can cause a problem if the cache line for LOAD 100 is evicted before the processor finishes executing LOAD 100. Note that this eviction can be caused by the return of another cache line for one of the later instructions executed in scout mode. The eviction of the cache line causes LOAD 100 to miss again in the L1 cache. As before, the processor generates a checkpoint (CHKPT0) at LOAD 100 and enters scout mode. Unfortunately, because the eviction is caused by one of the later instructions executed in scout mode, this sequence of instructions can repeat indefinitely, thereby ensnaring the processor in live-lock.

One solution to this problem is to generate a checkpoint (CHKPT1) at the first USE instruction (USE 101) that depends on the missed LOAD 100. In this way, when CHKPT1 is restored, the processor returns to USE 101, instead of to LOAD 100. Since at least one instruction has been executed upon returning from scout mode, the processor makes forward progress and live lock is avoided.

Unfortunately this solution fails where a LOAD instruction and a USE instruction are micro-operations within a single macroinstruction. Since the program counter only indicates macroinstructions, any checkpoint which the processor sets on the USE necessarily includes the LOAD.

For example, some of the "atomic" instructions, such as a compare-and-swap, contain multiple micro-operations within a single macroinstruction. Compounding the problem, the processor enters scout mode whenever encountering certain atomic instructions, making these instructions likely to cause a live-lock.

Hence what is needed is a method and apparatus for avoiding live-lock in a processor that supports speculative execution.

SUMMARY

One embodiment of the present invention provides a system which avoids a live-lock state in a processor that supports speculative-execution. The system starts by issuing instructions for execution in program order during execution of a program in a normal-execution mode. Upon encountering a launch condition during the execution of an instruction (a "launch instruction") which causes the processor to enter a speculative-execution mode, the system checks status indicators associated with a forward progress buffer. If the status indicators indicate that the forward progress buffer contains data for the launch instruction, the system resumes normal-execution mode. Upon resumption of normal-execution mode, the system retrieves the data from a data field contained in the forward progress buffer and executes the launch instruction using the retrieved data as input data for the launch instruction. The system next deasserts the status indicators. The system then continues to issue instructions for execution in program order in normal-execution mode. Using the forward progress buffer in this way prevents the processor from entering a potential live-lock state.

In a variation of this embodiment, if the launch condition occurs because the launch instruction encounters a miss in the L1 cache, the system sends a cache line request to remote memory, and enters speculative-execution mode.

In a variation of this embodiment, if the launch condition occurs because the launch instruction encounters a TLB miss, the system starts to fetch a corresponding virtual-to-physical address translation to satisfy the TLB miss, and enters speculative-execution mode.

In a variation of this embodiment, if the launch condition occurs because the launch instruction is a divide instruction, the system initiates the divide instruction, and enters speculative-execution mode.

In a variation of this embodiment, the status indicators include a "reserved" indicator, which is asserted when the forward progress buffer has been reserved for a launch instruction.

In a variation of this embodiment, the status indicators include a "past-trap" indicator, which is asserted when the launch instruction has passed a trap stage of a pipeline on the processor.

In a variation of this embodiment, the status indicators include a "valid" indicator, which is asserted when the returned cache line for the launch instruction has been written to the data field of the forward progress buffer.

In a variation of this embodiment, upon commencement of speculative execution if both the forward progress buffer reserved indicator and past-trap indicator are asserted and the valid indicator is de-asserted, the system issues the next instruction in program order in the speculative-execution mode.

In a variation of this embodiment, upon commencement of speculative execution if the forward progress buffer reserved indicator is deasserted, the system asserts the reserved indicator to reserve the forward progress buffer for the returned value for the launch instruction and issues the next instruction in program order in the speculative-execution mode.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Processor

Figure 1:
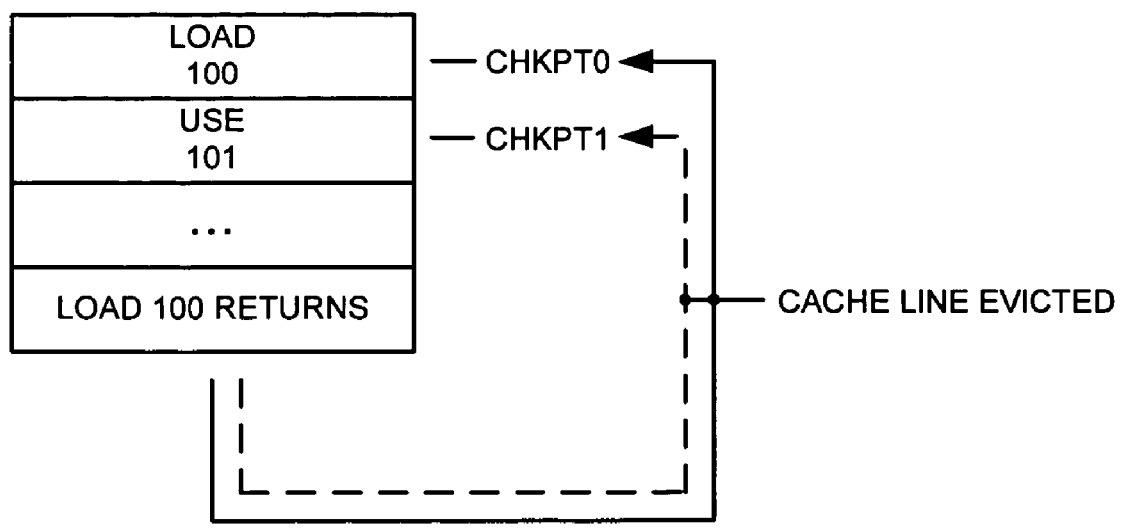
FIG. 1 illustrates a sequence of instructions that can cause a processor to enter a live-lock state.
Figure 2:
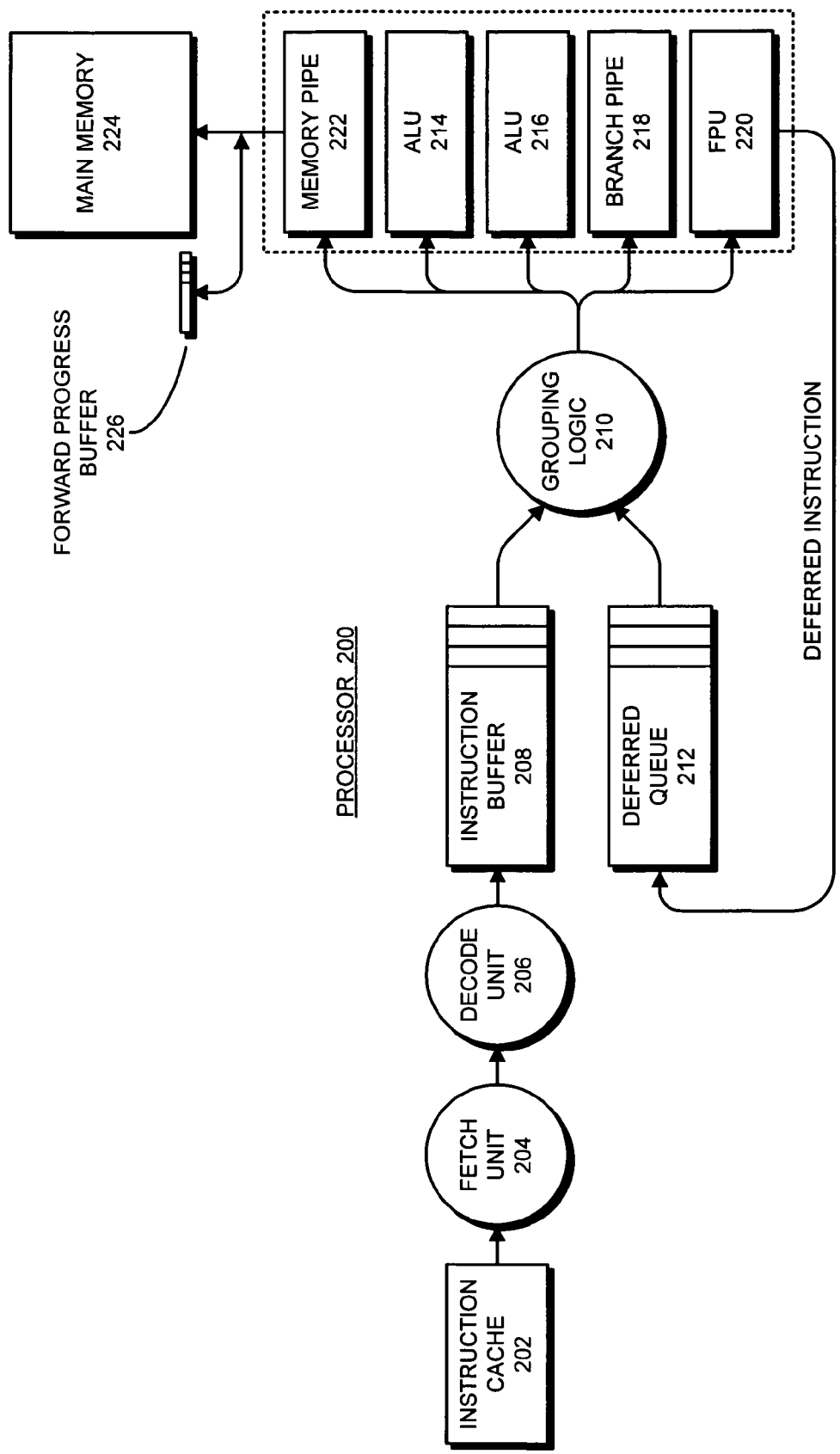
FIG. 2 illustrates the design of a processor that supports speculative-execution in accordance with an embodiment of the present invention.

FIG. 2 illustrates the design of processor 200, which supports speculative-execution, in accordance with an embodiment of the present invention. Processor 200 can generally include any type of processor, including, but not limited to, a microprocessor, a mainframe computer, a digital signal processor, a personal organizer, a device controller, and a computational engine within an appliance. As is illustrated in FIG. 2, processor 200 includes: instruction cache 202, fetch unit 204, decode unit 206, instruction buffer 208, deferred queue 212, grouping logic 210, main memory 224, arithmetic logic unit (ALU) 214, ALU 216, branch pipe 218, and floating point unit (FPU) 220.

Processor 200 also includes forward progress buffer 226. Forward progress buffer 226 is a hardware structure used by processor 200 to ensure forward progress when processor 200 encounters conditions that can potentially cause live-lock during speculative-execution.

During operation, fetch unit 204 retrieves instructions to be executed from instruction cache 202, and feeds these instructions into decode unit 206. Decode unit 206 forwards the instructions to be executed into instruction buffer 208, which is organized as a FIFO buffer. Instruction buffer 208 feeds instructions in program order into grouping logic 210, which groups instructions together and sends them to execution units, including memory pipe 222 (for accessing memory 224), ALU 214, ALU 216, branch pipe 218 (which resolves conditional branch computations), and floating point unit 220.

If an instruction cannot be executed due to an unresolved data dependency, such as an operand that has not returned from a load operation, the system defers execution of the instruction and moves the instruction into deferred queue 212. Note that like instruction buffer 208, deferred queue 212 is also organized as a FIFO buffer.

When the data dependency is eventually resolved, instructions from deferred queue 212 are executed in program order with respect to other deferred instructions, but not with respect to other previously executed non-deferred instructions. This process is explained in more detail below with respect to FIG. 3.

Speculative-Execution State Diagram

Figure 3:
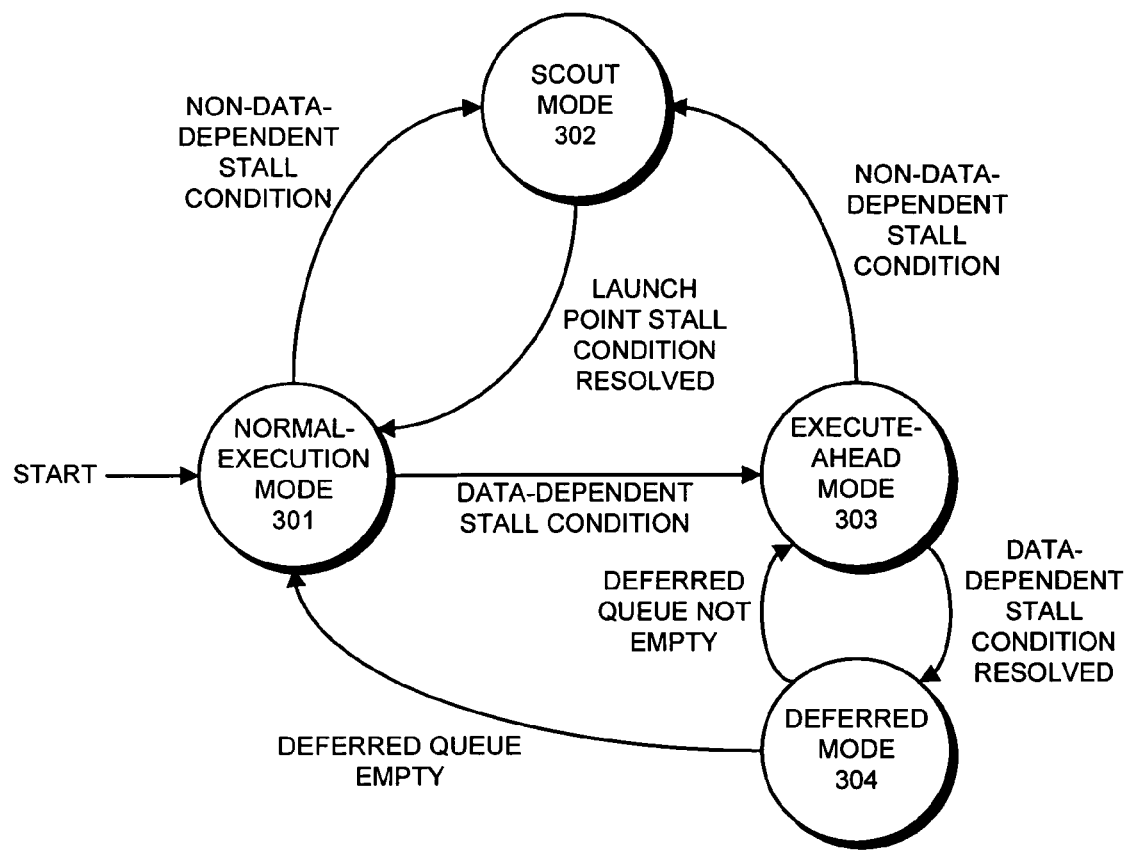
FIG. 3 presents a state diagram which includes a general depiction of execute-ahead mode, scout mode, and deferred mode in accordance with an embodiment of the present invention.

FIG. 3 presents a state diagram which includes a general depiction of execute-ahead mode 303, scout mode 302, and deferred mode 304 in accordance with an embodiment of the present invention.

The system starts in normal-execution mode 301, wherein instructions are executed in program order as they are issued from instruction buffer 208 (see FIG. 2).

Next, if an unresolved data dependency arises during execution of an instruction, the system moves to execute-ahead mode 303. An unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

While moving to execute-ahead mode 303, the system generates a checkpoint that can be used, if necessary, to return execution of the process to the point where the unresolved data dependency was encountered; this point is referred to as the "launch point." (Note that generating the checkpoint involves saving the precise architectural state of processor 200 to facilitate subsequent recovery from exceptions that arise during execute-ahead mode 303 or deferred mode 304.) The system also "defers" execution of the instruction that encountered the unresolved data dependency by storing the instruction in deferred queue 212.

While operating in execute-ahead mode 303, the system continues to execute instructions in program order as they are received from instruction buffer 208, and any instruction that cannot execute because of an unresolved data dependency is deferred (which involves storing the instruction in deferred queue 212).

During execute-ahead mode 303, if an unresolved data dependency is finally resolved, the system moves into deferred mode 304, wherein the system attempts to execute instructions from deferred queue 212 in program order. Note that the system attempts to execute these instructions in program order with respect to other deferred instructions in deferred queue 212, but not with respect to other previously executed non-deferred instructions (and not with respect to deferred instructions executed in previous passes through deferred queue 212). During this process, the system defers execution of deferred instructions that still cannot be executed because of unresolved data dependencies by placing these again-deferred instruction back into deferred queue 212. On the other hand, the system executes other instructions that can be executed in program order with respect to each other.

After the system completes a pass through deferred queue 212, if deferred queue 212 is empty, the system moves back into normal-execution mode 301. This may involve committing changes made during execute-ahead mode 303 and deferred mode 304 to the architectural state of processor 200, if such changes have not been already committed. The return to normal mode can also involve throwing away the checkpoint generated when the system moved into execute-ahead mode 303 as well as checkpoints generated during execute-ahead mode.

On the other hand, if deferred queue 212 is not empty after the system completes a pass through deferred queue 212, the system returns to execute-ahead mode 303 to execute instructions from instruction buffer 208 from the point where the execute-ahead mode 303 left off.

If a non-data dependent stall condition (except for a load buffer full or store buffer full condition) arises while the system is in normal-execution mode 301 or execute-ahead mode 303, the system moves into scout mode 302. (This non-data-dependent stall condition can include: an atomic instruction such as a memory barrier operation; or a deferred queue full condition.) During scout mode 302, instructions are speculatively executed to prefetch future loads, but results are not committed to the architectural state of processor 200.

Scout mode 302 is described in more detail in a pending U.S. patent application entitled, "Generating Prefetches by Speculatively Executing Code Through Hardware Scout Threading," by inventors Shailender Chaudhry and Marc Tremblay, having Ser. No. 10/741,944, and filing date 19 Dec. 2003, which is hereby incorporated by reference to describe implementation details of scout mode 302.

Unfortunately, computational operations performed during scout mode 302 are not committed to the architectural state of the processor, and hence need to be recomputed again upon returning to normal execution mode, which can require a large amount of computational work.

When the original "launch point" stall condition is finally resolved, the system moves back into normal-execution mode 301, and, in doing so, uses the previously generated checkpoint to resume execution from the launch point instruction that encountered the launch point stall condition. The launch point stall condition is the stall condition that originally caused the system to move out of normal-execution mode 301. For example, the launch point stall condition can be the data-dependent stall condition that caused the system to move from normal-execution mode 301 to execute-ahead mode 303, before moving to scout mode 302. Alternatively, the launch point stall condition can be the non-data-dependent stall condition that caused the system to move directly from normal-execution mode 301 to scout mode 302.

The Forward Progress Buffer

Figure 4A:
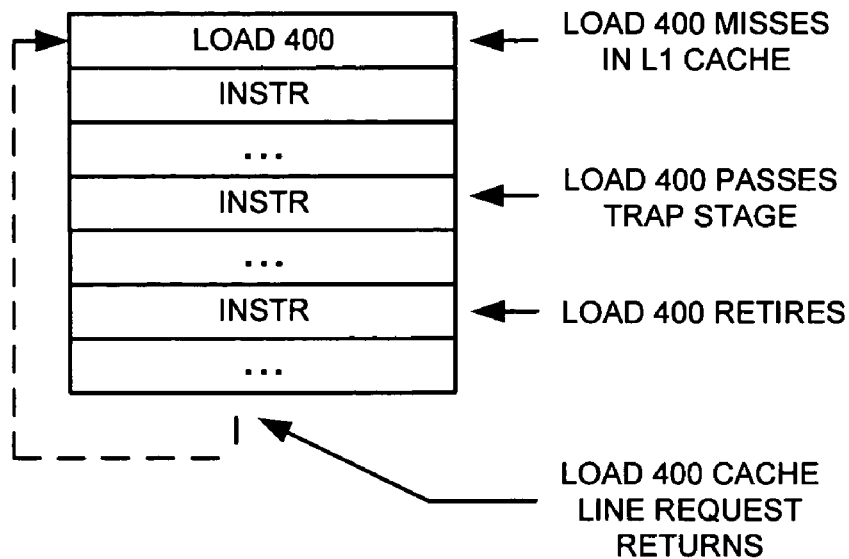
FIG. 4A illustrates a sequence of instructions in accordance with an embodiment of the present invention.
Figure 4B:
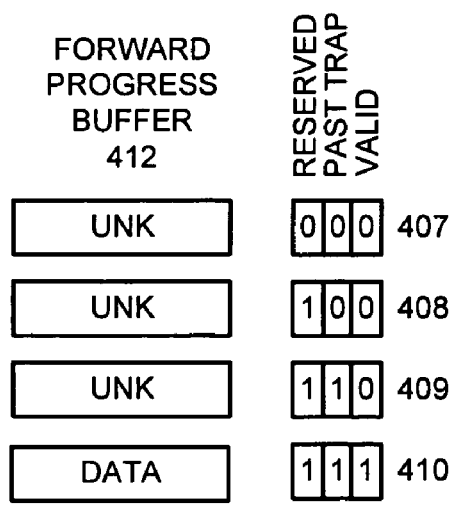
FIG. 4B illustrates a progression of states in a forward progress buffer in accordance with an embodiment of the present invention.

FIG. 4A illustrates a sequence of instructions and FIG. 4B illustrates a corresponding progression of states for forward progress buffer 412 in accordance with an embodiment of the present invention.

Forward progress buffer 412 retains a copy of the cache line loaded to the L1 cache from memory for the launch instruction (the instruction that caused processor 200 to enter speculative-execution) during speculative execution. When subsequently re-executing the launch instruction after returning to normal-execution mode, processor 200 retrieves the copy of the cache line held in forward progress buffer 412—instead of depending on the L1 cache. Hence, using forward progress buffer 412 eliminates the possibility of processor 200 relying on a cache line that has been evicted.

Forward progress buffer 412 is comprised of a data field and several status indicators. The data field is used to hold a copy of the returned cache line for launch instruction. The status indicators specify the state of the data field. More specifically, the status indicators include: a "reserved" indicator, a "past-trap" indicator, and a "valid" indicator.

The reserved indicator specifies to processor 200 whether forward progress buffer 412 is currently reserved for a launch instruction. When the reserved indicator is asserted, forward progress buffer 412 is waiting for a returned cache line. The reserved indicator is asserted when processor 200 enters speculative execution mode and reserves forward progress buffer 412 for the launch instruction. The reserved indicator can be de-asserted during the handling of a trap condition, during the handling of an interrupt, or when processor 200 uses the value stored in forward progress buffer 412 following the return to normal-execution mode.

The past-trap indicator specifies to processor 200 whether the launch instruction has progressed past the "trap" stage of the pipeline. The past-trap indicator is asserted when the launch instruction progresses past the trap stage during speculative execution. The past-trap indicator can be de-asserted during the handling of an interrupt or when processor 200 uses the value stored in forward progress buffer 412 following the return to normal-execution mode.

The valid indicator specifies whether the data in the data field of forward progress buffer 412 is contains valid data. The valid indicator is asserted when the cache line is written to forward progress buffer 412. The valid indicator is de-asserted when processor 200 ultimately uses the value stored in forward progress buffer 412 following the return to normal-execution mode.

An Example

In the following example, forward progress buffer 412 starts in state 407 with the data in the data field unknown and all status indicators deasserted.

Processor 200 first executes LOAD 400. LOAD 400 misses in the L1 cache and processor 200 sends a cache line request to remote memory. Because of the miss, processor 200 sets a checkpoint at LOAD 400 and enters scout mode 302 (see FIG. 3).

Upon entering scout mode 302, processor 200 asserts the forward progress buffer reserved indicator (state 408), to indicate that forward progress buffer 412 is awaiting the result of LOAD 400. LOAD 400 then continues to progress down the pipeline.

Eventually, LOAD 400 progresses past the trap stage of the pipeline and processor 200 asserts the past-trap indicator for forward progress buffer 412 (state 409).

As processor 200 continues in scout mode, LOAD 400 retires. Following the retirement of LOAD 400, a number of instructions are executed before the cache line requested for LOAD 400 returns from remote memory. When the cache line returns, a copy of the cache line is written into the data field of forward progress buffer 412 and processor 200 asserts the valid indicator (state 410).

Because the cache line for LOAD 400 has returned, processor 200 resumes execution in normal-execution mode 301 using the checkpoint previously set at LOAD 400 (as indicated by the dashed line). The first instruction executed upon returning to normal-execution mode 301 is LOAD 400. When executing LOAD 400, processor 200 checks the state of the status indicators for forward progress buffer 412. Since the status indicators indicate that the data in the data field of forward progress buffer is valid, processor 200 loads the necessary data for LOAD 400 from the forward progress buffer (and not from the cache line).

The Process of Using the Forward Progress Buffer

Figure 5:
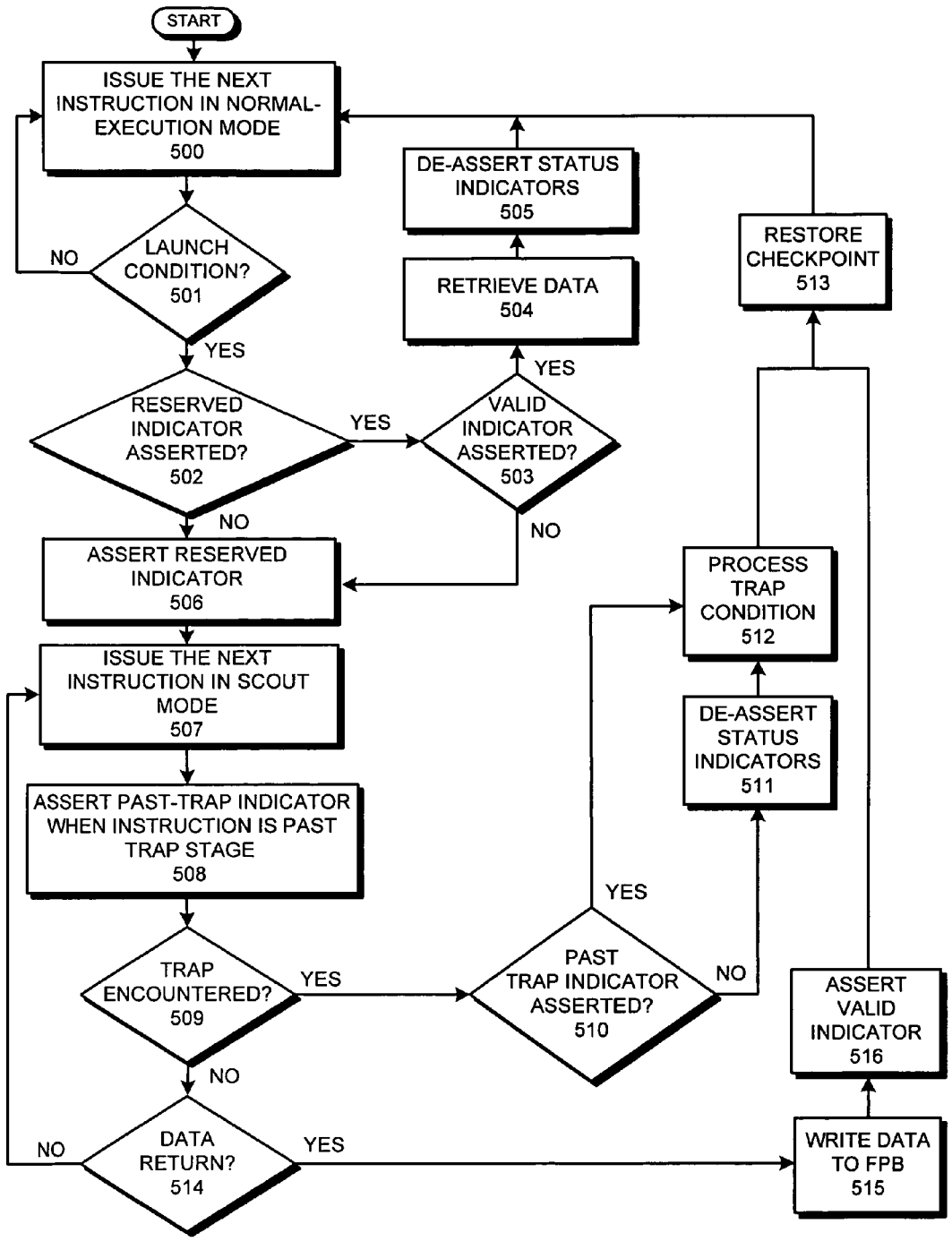
FIG. 5 presents a flow chart that illustrates the process of using a forward progress buffer in accordance with an embodiment of the present invention.

FIG. 5 presents a flow chart that illustrates the process of using a forward progress buffer in accordance with an embodiment of the present invention.

The process starts with processor 200 issuing an instruction in normal-execution mode (step 500). If the instruction is a "launch instruction" that causes a launch condition (step 501), processor 200 enters scout mode 302 (see FIG. 3). If the instruction does not cause a launch condition, processor 200 returns to step 500 to issue the next instruction in program order.

Upon entering scout mode 302, processor 200 checks the state of the reserved indicator to determine if the forward progress buffer has already been reserved (step 502). If not, processor 200 asserts the reserved indicator, thereby reserving the forward progress buffer for the launch instruction (step 506) and issues the next instruction in scout mode 302 (step 507).

If the reserved indicator is asserted, processor 200 checks the valid indicator (step 503). If the valid indicator is asserted, processor 200 retrieves the data for the instruction from the forward progress buffer (step 504). Since the data in the forward progress buffer may only be used once (for the re-execution of the launch instruction), processor 200 de-asserts the status indicators (step 505). Processor 200 then executes the launch instruction using the data from the forward progress buffer and returns to step 500 to issue the next instruction in normal-execution mode.

If the valid indicator is deasserted (step 503), processor 200 deasserts all the status indictors and then proceeds to step 506 as if the reserved indicator was deasserted upon entry to scout mode 302. Note that when the reserved indicator is asserted and the valid indicator is deasserted upon entry to scout mode 302, processor 200 was interrupted before the cache line request generated by a previous execution of the launch instruction (also in scout mode 302) could return.

As processor 200 issues each instruction in scout mode 302 (step 507), processor 200 also monitors the progress of the launch instruction through the pipeline. When the launch instruction progresses past the pipeline trap stage, processor 200 asserts the past-trap indicator (step 508).

If processor 200 encounters a trap (step 509, yes), processor 200 annuls all the instructions before the trap stage of the pipeline. Processor 200 also checks the state of the past-trap indicator (step 510). If the past trap indicator is de-asserted, the launch instruction was in a stage of the pipeline before the trap stage and has been annulled with the other pre-trap-stage instructions. Because the launch instruction is no longer in the pipeline, processor 200 deasserts the status indicators (step 511). After de-asserting the status indicators, processor 200 processes the trap condition (step 512). Processor 200 then restores the checkpoint (step 513) and returns to step 500 to issue the next instruction in normal-execution mode 301.

If the past-trap indicator is asserted, the launch instruction is past the trap stage of the pipeline (and is therefore not annulled during the handling of the trap condition). Consequently, processor 200 does not modify the state of the status indicators when processing the trap condition (step 512). Processor 200 then restores the checkpoint (step 513) and returns to step 500 to issue the next instruction in normal-execution mode 301.

Processor 200 also monitors the memory system for the return of the cache line request associated with the launch instruction (step 514). If the cache line has not returned, processor 200 returns to step 507 and issues the next instruction in scout mode 302.

When the cache line returns (step 514), processor 200 writes a copy of the returned cache line to the forward progress buffer (step 515) and asserts the valid indicator (step 516). Processor 200 then restores the state of processor 200 from the checkpoint (step 513) and returns to step 500 to issue the next instruction in normal-execution mode 301.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for avoiding a live-lock state in a processor that supports speculative-execution, comprising:
   issuing instructions for execution in program order during execution of a program in a normal-execution mode;
   upon encountering a launch condition during the execution of an instruction (a "launch instruction") which causes the processor to enter a speculative-execution mode;
   checking status indicators in a forward progress buffer, wherein the forward progress buffer is a hardware structure separate from a cache, wherein the forward progress buffer and the cache both receive a copy of a cache line that is returned during speculative execution for the launch instruction, and wherein the copy of the cache line in the cache is used for execution of instructions other than the launch instruction, while the copy of the cache line in the forward progress buffer is not used for execution of instructions other than the launch instruction, but is used only to supply data for the launch instruction upon re-executing the launch instruction;
   wherein if the status indicators in the forward progress buffer indicate that the forward progress buffer contains data for the launch instruction, the method further comprises;
      resuming normal-execution mode;
      retrieving the data from a data field in the forward progress buffer;
      executing the launch instruction using the retrieved data as input data for the launch instruction;
      deasserting the status indicators in the forward progress buffer; and
      continuing to issue instructions for execution in program order in normal-execution mode;
   otherwise, continuing executing in the speculative-execution mode.

2. The method of claim 1, wherein if the launch condition occurs because the launch instruction encounters a miss in an L1 cache, executing the launch instruction involves:
   requesting a cache line from a remote memory; and
   entering speculative-execution mode.

3. The method of claim 1, wherein if the launch condition occurs because the launch instruction encounters a TLB miss, executing the launch instruction involves:
   starting to fetch a corresponding virtual-to-physical address translation to satisfy the TLB miss; and
   entering speculative-execution mode.

4. The method of claim 1, wherein if the launch condition occurs because the launch instruction is a divide instruction, executing the launch instruction involves:
   initiating the divide instruction; and
   entering speculative-execution mode.

5. The method of claim 1, wherein the status indicators in the forward progress buffer include a "reserved" indicator, which is asserted when the forward progress buffer has been reserved for a launch instruction.

6. The method of claim 5, wherein the status indicators in the forward progress buffer include a "past-trap" indicator, which is asserted when the launch instruction has passed a trap stage of a pipeline on the processor.

7. The method of claim 6, wherein the status indicators in the forward progress buffer include a "valid" indicator, which is asserted when a returned cache line for the launch instruction has been written to the data field in the forward progress buffer.

8. The method of claim 7, wherein upon commencement of speculative execution if both the reserved indicator and past-trap indicator in the forward progress buffer are asserted and the valid indicator in the forward progress buffer is deasserted, which indicates that the forward progress buffer does not contain data for the launch condition, the method further comprises issuing a next instruction in program order in the speculative-execution mode.

9. The method of claim 7, wherein upon commencement of speculative execution if the reserved indicator in the forward progress buffer is deasserted, the method farther comprises:
   asserting the reserved indicator in the forward progress buffer to reserve the forward progress buffer for a returned value for the launch instruction; and
   issuing the next instruction in program order in the speculative-execution mode.

10. An apparatus that avoids a live-lock state in a processor that supports speculative-execution, comprising:
    an execution mechanism on the processor;
    wherein the execution mechanism is configured to issue instructions for execution in program order during execution of a program in a normal-execution mode;
    upon encountering a launch condition during the execution of an instruction (a "launch instruction") which causes the processor to enter a speculative-execution mode, the execution mechanism is configured to check status indicators in a forward progress buffer, wherein the forward progress buffer is a hardware structure separate from a cache, wherein the forward progress buffer and the cache both receive a copy of a cache line that is returned during speculative execution for the launch instruction, and wherein the copy of the cache line in the cache is used for execution of instructions other than the launch instruction, while the copy of the cache line in the forward progress buffer is not used for execution of instructions other than the launch instruction, but is used only to supply data for the launch instruction upon re-executing the launch instruction;
    wherein if the status indicators in the forward progress buffer indicate that the forward progress buffer contains data for the launch instruction, the execution mechanism is configured to
       resume normal-execution mode;
       retrieve the data from a data field in the forward progress buffer;
       execute the launch instruction using the retrieved data as input data for the launch instruction;
       deassert the status indicators in the forward progress buffer; and
       continue to issue instructions for execution in program order in normal-execution mode;
    otherwise, the execution mechanism is configured to continue executing in the speculative-execution mode.

11. The apparatus of claim 10, wherein when a launch condition occurs because the launch instruction encounters a miss in an L1 cache, the execution mechanism is configured to:
    request a cache line from a remote memory; and to
    enter speculative-execution mode.

12. The apparatus of claim 10, wherein when a launch condition occurs because the launch instruction encounters a TLB miss, the execution mechanism is configured to:
    start fetching a corresponding virtual-to-physical address translation to satisfy the TLB miss; and to
    enter speculative-execution mode.

13. The apparatus of claim 10, wherein when a launch condition occurs because the launch instruction is a divide instruction, the execution mechanism is configured to:

initiate the divide instruction; and to enter speculative-execution mode.

14. The apparatus of claim 10, wherein the execution mechanism is configured so that the status indicators in the forward progress buffer include a "reserved" indicator, which is asserted when the forward progress buffer has been reserved for a launch instruction.

15. The apparatus of claim 14, wherein the execution mechanism is configured so that the status indicators in the forward progress buffer include a "past-trap" indicator, which is asserted when the launch instruction has passed a trap stage of a pipeline on the processor.

16. The apparatus of claim 15, wherein the execution mechanism is configured so that the status indicators in the forward progress buffer include a "valid" indicator, which is asserted when a returned cache line for the launch instruction has been written to the data field in the forward progress buffer.

17. The apparatus of claim 16, wherein upon commencement of speculative execution if both the reserved indicator in the forward progress buffer and past-trap indicator in the forward progress buffer are asserted and the valid indicator in the forward progress buffer is deasserted, which indicates that the forward progress buffer does not contain data for the launch condition, the execution mechanism is configured to issue a next instruction in program order in the speculative-execution mode.

18. The apparatus of claim 16, wherein upon commencement of speculative execution if the reserved indicator in the forward progress buffer is deasserted, the execution mechanism is configured to:

assert the reserved indicator in the forward progress buffer to reserve the forward progress buffer for a returned value for the launch instruction; and to issue the next instruction in program order in the speculative-execution mode.

19. A computer system that avoids a live-lock state in a processor that supports speculative-execution, comprising:

a memory;

an execution mechanism on the processor;

wherein the execution mechanism is configured to issue instructions for execution in program order during execution of a program in a normal-execution mode;

upon encountering a launch condition during the execution of an instruction (a "launch instruction") which causes the processor to enter a speculative-execution mode, the execution mechanism is configured to check status indicators in a forward progress buffer, wherein the forward progress buffer is a hardware structure separate from a cache, wherein the forward progress buffer and the cache both receive a copy of a cache line that is returned during speculative execution for the launch instruction, and wherein the copy of the cache line in the cache is used for execution of instructions other than the launch instruction, while the copy of the cache line in the forward progress buffer is not used for execution of instructions other than the launch instruction, but is used only to supply data for the launch instruction upon re-executing the launch instruction;

wherein if the status indicators in the forward progress buffer indicate that the forward progress buffer contains data for the launch instruction, the execution mechanism is configured to:

resume normal-execution mode;

retrieve the data from a data field in the forward progress buffer;

execute the launch instruction using the retrieved data as input data for the launch instruction;

deassert the status indicators in the forward progress buffer; and continue to issue instructions for execution in program order in normal-execution mode;

otherwise, the execution mechanism is configured to continue executing in the speculative-execution mode.

20. The computer system of claim 19, wherein upon commencement of speculative execution if both the reserved indicator in the forward progress buffer and the past-trap indicator in the forward progress buffer are asserted and a valid indicator in the forward progress buffer is deasserted, which indicates that the forward progress buffer does not contain data for the launch condition, the execution mechanism is configured to issue a next instruction in program order in the speculative-execution mode.

* * * * *

UNITED STATES PATENT AND TRADEMARK OFFICE
CERTIFICATE OF CORRECTION

| | |
|---|---|
| PATENT NO. | : 7,634,639 B2 |
| APPLICATION NO. | : 11/210557 |
| DATED | : December 15, 2009 |
| INVENTOR(S) | : Shailender Chaudhry et al. |

Page 1 of 1

It is certified that error appears in the above-identified patent and that said Letters Patent is hereby corrected as shown below:

In claim 9 (at column 10, line 14), please replace the word "farther" with the word --further--.

Signed and Sealed this

Twenty-third Day of March, 2010

David J. Kappos
*Director of the United States Patent and Trademark Office*